(12) United States Patent
Mitra et al.

(10) Patent No.: US 9,503,305 B1
(45) Date of Patent: Nov. 22, 2016

(54) METHOD FOR LOW COMPLEXITY DECISION METRIC COMPRESSION OF HIGHER-ORDER SQUARE-QAM CONSTELLATION

(71) Applicant: Huawei Technologies Co., Ltd., Shenzhen (CN)

(72) Inventors: Jeebak Mitra, Ottawa (CA); Zhuhong Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/849,281

(22) Filed: Sep. 9, 2015

(51) Int. Cl.
| | |
|---|---|
| *H04B 1/66* | (2006.01) |
| *H03K 9/00* | (2006.01) |
| *H04L 27/00* | (2006.01) |
| *H04L 27/06* | (2006.01) |
| *H04L 27/36* | (2006.01) |
| *H04L 1/00* | (2006.01) |

(52) U.S. Cl.
CPC ............. *H04L 27/36* (2013.01); *H04L 1/0003* (2013.01); *H04L 1/004* (2013.01)

(58) Field of Classification Search
USPC .................... 375/211, 219, 222, 240, 240.24, 375/240.26, 240.22, 240.11, 240.03, 254, 375/245, 243, 259, 262, 267, 253, 316, 340, 375/341, 324, 342, 346, 354
See application file for complete search history.

(56) References Cited

U.S. PATENT DOCUMENTS

| | | | | |
|---|---|---|---|---|
| 5,440,572 | A * | 8/1995 | Kitaori ............. | G11B 20/10009 341/107 |
| 8,582,696 | B2 * | 11/2013 | Oh .................... | H04L 25/03184 375/262 |
| 2004/0128592 | A1 | 7/2004 | Park | |
| 2009/0074038 | A1 * | 3/2009 | Lentmaier ............... | G01S 19/37 375/148 |
| 2010/0005356 | A1 * | 1/2010 | Cho .................. | H03M 13/6306 714/749 |
| 2012/0033767 | A1 * | 2/2012 | Wilborn ............ | H04L 25/03184 375/341 |
| 2012/0047408 | A1 * | 2/2012 | Wilborn ............ | H03M 13/6525 714/718 |
| 2013/0120169 | A1 * | 5/2013 | Li ........................ | H03M 13/112 341/94 |
| 2013/0205184 | A1 * | 8/2013 | Nishimoto .......... | H03M 13/255 714/776 |
| 2013/0297996 | A1 * | 11/2013 | Wilborn ............ | H03M 13/6525 714/807 |
| 2015/0082133 | A1 * | 3/2015 | Cao ..................... | G06F 11/1004 714/807 |
| 2016/0087758 | A1 * | 3/2016 | Nekuii .................. | H04L 1/0045 714/807 |

OTHER PUBLICATIONS

Caire, G., et al., "Bit-Interleaved Coded Modulation," IEEE Transactions on Information Theory, vol. 44, No. 3, May 1998, pp. 927-946.

Chang, C., et al., "A Systematic Bit-Wise Decomposition of M-ary Symbol Metric," IEEE Transactions on Wireless Communications, Oct. 2006, pp. 2742-2751.

(Continued)

*Primary Examiner* — Linda Wong
(74) *Attorney, Agent, or Firm* — Slater Matsil, LLP

(57) ABSTRACT

It is possible to compress log likelihood ratios (LLRs) by exploiting the mapping symmetry between bits in the same symbol. For example, two LLRs corresponding to the same dimension of a square Quadrature Amplitude Modulation (QAM) symbol can be compressed into a single compressed LLR that excludes the magnitude bits of one of the LLRs because the magnitude component of LLRs for bits corresponding to the same dimension of a square QAM symbol exhibit a piecewise linear relationship with one another. Similar techniques can be used to exploit piecewise linear relationships between a subset of constellation points in a non-square QAM constellation.

24 Claims, 11 Drawing Sheets

(56) References Cited

OTHER PUBLICATIONS

Danieli, M., et al., "Maximum Mutual Information Vector Quantization of Log-Likelihood Ratios for Memory Efficient HARQ Implementations," IEEE Data Compression Conference (DCC), Mar. 2010, pp. 30-39.

ETSI EN 302 769: "Digital Video Broadcasting(DVB); Frame structure channel coding and modulation for a second generation digital transmission system for cable systems (DVB-C2)," Dec. 2010, 111 pages.

Rave, W., "Quantization of Log-Likelihood Ratios to Maximize Mutual Information," IEEE Signal Processing Letters, vol. 16, No. 4, Apr. 2009, pp. 283-286.

Rosati, S., et al., "LLR Compression for BICM Systems Using Large Constellations," IEEE Transactions on Communications, vol. 61, No. 7, Jul. 2013, pp. 2864-2875.

Yazdani, R. et al., "Linear LLR Approximation for Iterative Decoding on Wireless Channels," IEEE Transactions on Communications, vol. 57, No. 11, Nov. 2009, pp. 3278-3287.

Zehavi, E., "8-PSK Trellis Codes for a Rayleigh Channel," IEEE Transactions on Communications, vol. 40, No. 5, May 1992, pp. 873-884.

\* cited by examiner

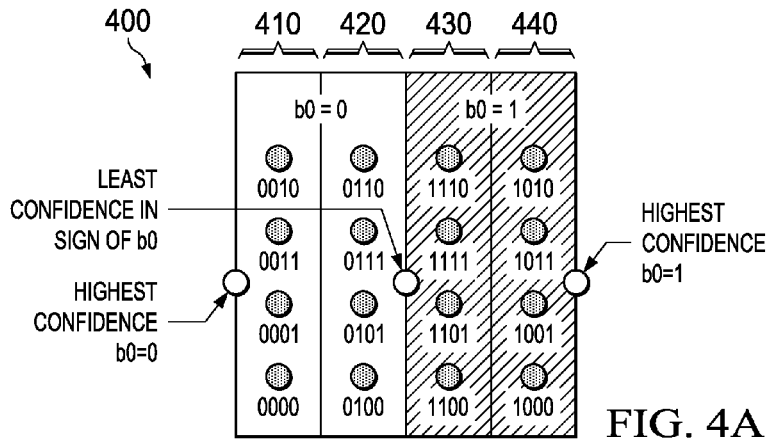
FIG. 4A
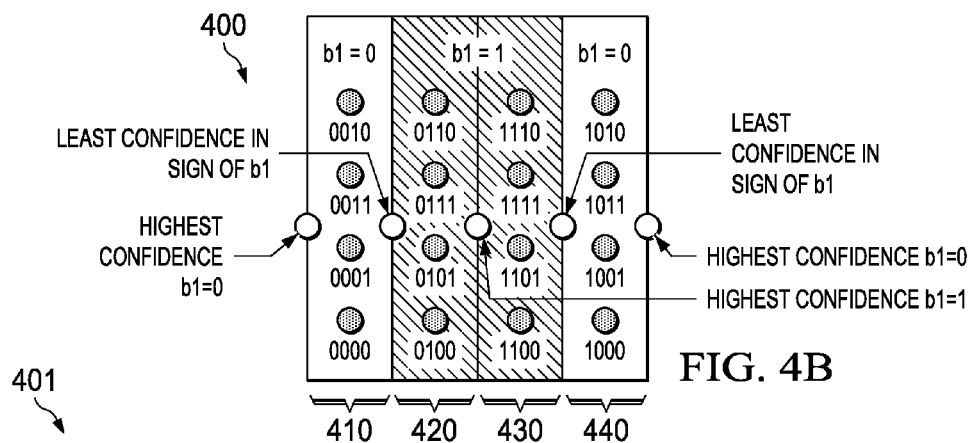
FIG. 4B
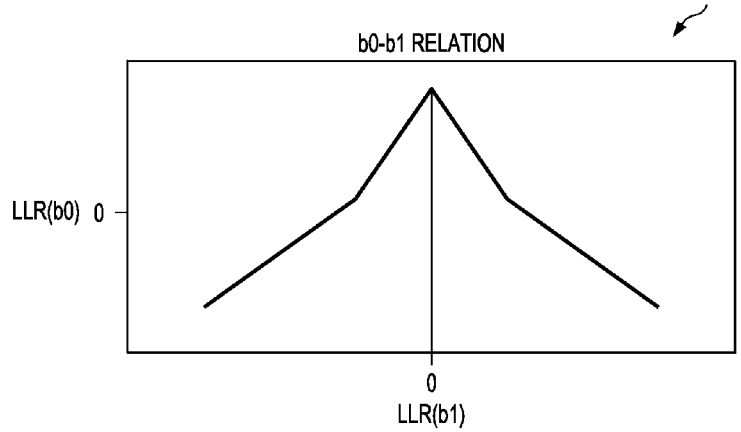
FIG. 4C
FIG. 4D

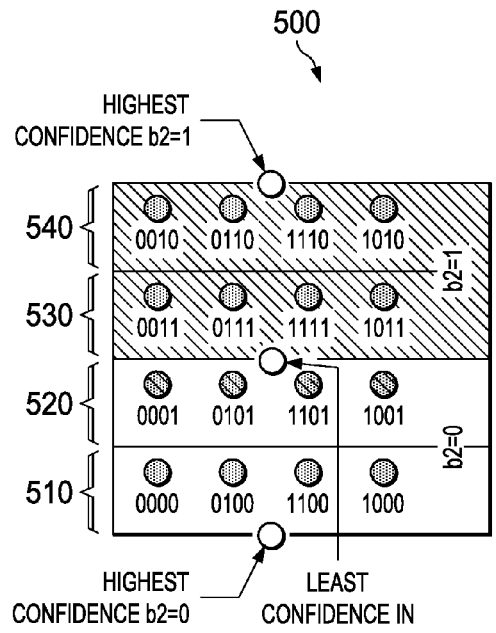
FIG. 5A
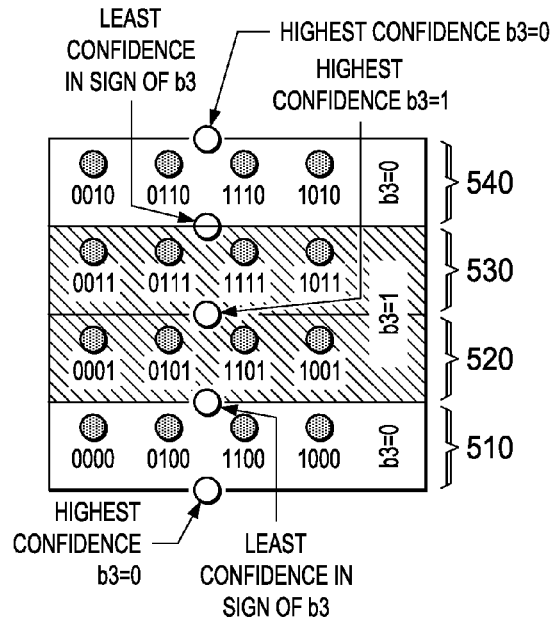
FIG. 5B
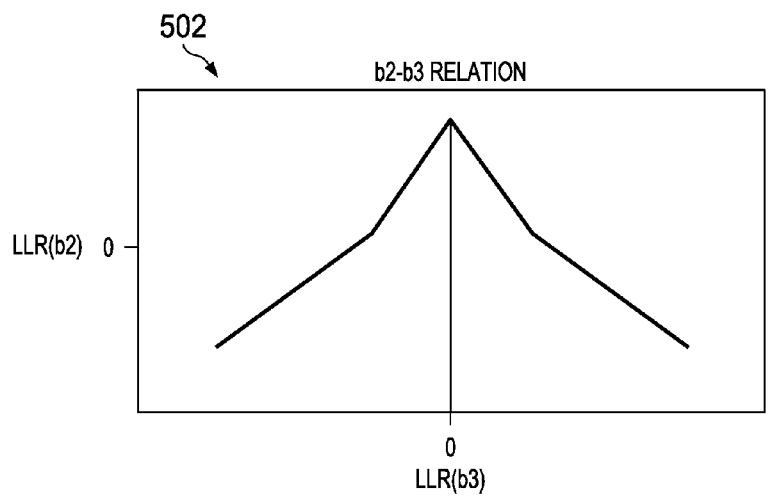
FIG. 5C
FIG. 5D

METHOD FOR LOW COMPLEXITY DECISION METRIC COMPRESSION OF HIGHER-ORDER SQUARE-QAM CONSTELLATION

TECHNICAL FIELD

The present invention relates generally to decoding communication signals, and in particular embodiments, to methods for low complexity decision metric compression of higher-order square-QAM constellations.

BACKGROUND

Higher symbol (baud) rates are likely to be implemented in next-generation networks to provide data rates in excess of 100 Gigabits per second (Gbps) over relatively long distances, e.g., 500 kilometers or more. Some network components may be unable to support such high symbol rates without introducing significant distortion into the signal. One form of signal distortion is inter-symbol interference (ISI), which occurs when leading symbols interfere with trailing symbols. ISI typically results when a signal is communicated over a dispersive channel, which causes individual pulses of symbols in the signal to appear smeared and/or broadened upon reception. The source of ISI is largely medium dependent. In wireless channels, ISI is primarily attributable to multipath propagation, which occurs when the wireless signal traverses multiple paths between the transmitter and the receiver, e.g., as may result from the transmitted signal reflecting off boundaries such as the ground, bodies of water, and physical objects between the transmitter and receiver. In optical channels, ISI is primarily attributable to chromatic dispersion, which occurs when light traveling through the fiber exhibits different speeds at different wavelengths. Additionally, ISI may be attributable to the bandlimited nature of optical front-ends and various network elements, e.g., wavelength selective switches (WSS). Excessive ISI can cause errors during signal decoding at the receiver.

At the receiver, received signals are demodulated to determine a complex value associated with each symbol carried by the signal. The demodulated symbols are then decoded at the bit-level to determine binary values for each of the bits in each of the symbols. ISI may introduce errors into symbol demodulation by causing the received symbols to be mapped to the incorrect constellation point. This may, in turn, cause errors during bit-level decoding. To reduce bit error rates, soft-output information is often used as an input-parameter during bit-level decoding in conjunction with forward error correction (FEC). Soft-output information may be generated from symbol demodulation and/or equalization, and often includes log likelihood ratios (LLRs), which are values that indicate how many times more likely a bit is to be one binary value than the other binary value. LLRs may be particularly prevalent in communications systems that employ iterative forward error correction (FEC) encoding schemes. In particular, FEC encoding introduces redundancy in the transmitted data which can be leveraged by the receiver by means of FEC decoding to lower the error rates of the transmitted data to desired levels. In most high performance FEC designs, the decoder invariably accepts soft information that is iteratively refined over certain cycles of the FEC processing.

SUMMARY OF THE INVENTION

Technical advantages are generally achieved, by embodiments of this disclosure which describe methods for low complexity decision metric compression of higher-order square-QAM Constellations.

In accordance with an embodiment, a method for compressing soft output information is provided. In this example, the method includes receiving log likelihood ratios (LLRs) for a modulation symbol that include at least a first LLR for a first binary information bit in the modulation symbol and a second LLR for a second binary information bit in the modulation symbol, and compressing the first LLR and the second LLR to obtain a compressed LLR. A magnitude component of the second LLR is excluded from the compressed LLR. The method further includes communicating the compressed LLR to a symbol de-interleaver. An apparatus for performing this method is also provided.

In accordance with another embodiment, a method for de-compressing soft output information is provided. In this example, the method includes receiving a compressed log likelihood ratio (LLR) that includes a first sign bit indicating a value of a first binary information bit in a modulation symbol, a first set of magnitude bits indicating a confidence level of the first sign bit, and a second sign bit indicating a value of a second binary information bit in the modulation symbol. The method further includes decompressing the compressed LLR to obtain a first LLR for the first binary information bit and a second LLR for the second binary information bit. The first LLR includes the first sign bit and the first set of magnitude bits. The second LLR includes the second sign bit and a second set of magnitude bits indicating a confidence level in the second sign bit. The method further includes communicating the first LLR and the second LLR to a bit-level decoder. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 4A shows decision regions for a b0 bit of a gray-mapped 16 QAM constellation;

FIG. 4B shows decision regions for a b1 bit of a gray-mapped 16 QAM constellation;

FIG. 4C is a table of signs for b0 and b1 bits of a 16 QAM symbol;

FIG. 4D is a graph demonstrating the piecewise linear relationship between LLRs of b0 and b1 bits of a 16 QAM symbol;

FIG. 5A shows decision regions for a b2 bit of a gray-mapped 16 QAM constellation;

FIG. 5B shows decision regions for a b3 bit of a gray-mapped 16 QAM constellation;

FIG. 5C is a table of signs for b2 and b3 bits of a 16 QAM symbol;

FIG. 5D is a graph demonstrating the piecewise linear relationship between LLRs of b2 and b3 bits of a 16 QAM symbol;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
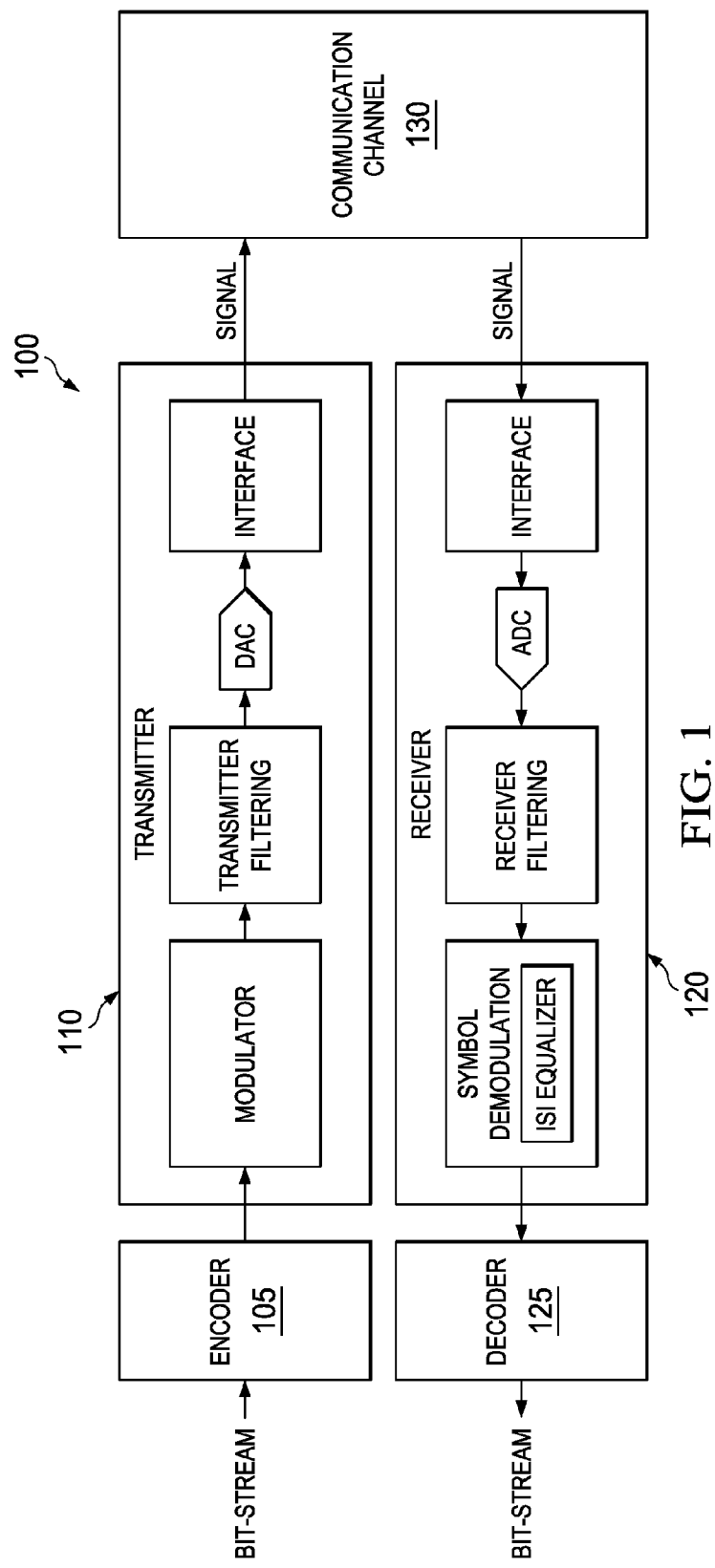
FIG. 1 is a diagram of a communications system.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims. As used herein, the term "binary information bit" refers to bit in a transmitted signal, including information bits and parity bits.

More specifically, each binary information bit in a symbol may be represented by an LLR that includes a sign bit indicating a value of the binary information bit and a set of magnitude bits indicating a confidence level of the sign bit. When using a finite number of fixed point representation bits, the number of bits used to represent the magnitude determines the confidence level in the sign bit. Different numbers of magnitude bits may be required for different bit-level decoding schemes to achieve acceptable BERs.

It is often necessary to perform some processing (e.g., de-interleaving) on LLRs before using them as an input parameter during bit-level decoding. For example, some receivers may need to perform symbol-level de-interleaving after generating the LLRs when a corresponding symbol interleaver is also used at the transmitter, in which case groups of LLRs corresponding to the same symbol are de-interleaved prior to bit-level decoding. Because de-interleaving is generally performed on large data blocks, the LLRs must generally be stored in memory for at least some period so that the entire block of data can be received. Because LLRs use multiple bits (i.e., sign bit+K−1 magnitude bits) to convey statistical information of a single binary information bit, the number of bits used to represent LLRs for the transmitted information bits or FEC-encoded bits may significantly impact memory requirements for the de-interleaver, as well as other components/processes that may necessitate storage of LLRs such as Hybrid Automatic Repeat reQuest (HARQ) processing. Moreover, the computational complexity of de-interleaving and other processing of LLRs is highly dependent on the number of bits required to represent the LLRs. Thus, the length of the LLRs may significantly impact the cost, performance, and power consumption of the receiver.

Provided herein are embodiment LLR compression techniques that exploit the mapping symmetry between bits in the same symbol to compresses two LLRs (i.e., LLRs for two bits) into a single compressed LLR that excludes the magnitude bits of one of the LLRs. More specifically, the magnitude component of LLRs for bits corresponding to the same dimension of a square Quadrature Amplitude Modulation (QAM) symbol exhibit a piecewise linear relationship with one another, meaning that the magnitude of one of the LLRs can be used to derive the magnitude component of the other LLR. Similar techniques can be used to exploit piecewise linear relationships between a subset of constellation points in a non-square QAM constellation. By way of example, a 16 Quadrature Amplitude Modulation (16-QAM) symbol maps to four bits [b0 b1 b2 b3], with the b0 and b1 bits corresponding to one dimension of the complex value, and the b2 and b3 bits corresponding to the other dimension of the complex value. As is explained in greater detail below, the piecewise linear relationship between the magnitude components of LLRs for the b0 and b1 bits allow the magnitude component of LLR for the b1 bit to be derived from the magnitude component of the LLR for the b0 bit. Embodiments of this disclosure exploit that piecewise linear relationship to compress the LLRs for the b0 and b1 bits into a single compressed LLR that includes the sign bits of the LLRs for the b0 and b1 bits and the magnitude component of the LLR for the b0 bit, but excludes the magnitude component of the LLR for the b1 bit. There is a comparable piecewise linear relationship between magnitude components of the LLRs for the b2 and b3 bits, which allows those LLRs to be compressed in a similar fashion such that the resulting compressed LLR excludes the magnitude component of the LLR for the b3 bit. The exclusion of the magnitude components of the b1 and b3 bits from the resulting compressed LLRs provides significant memory savings. For example, in a system that computes four-bit LLRs for each bit of a 16-QAM symbol, the LLR compression techniques would compress sixteen bits of soft information (i.e., four LLRs each containing a sign bit and three magnitude bits) into ten bits of soft information (i.e., two compressed LLRs each containing two sign bits and three magnitude bits). These and other details are discussed in greater detail below.

Embodiments of this disclosure can be used in any forward error correction (FEC) coded communication system that employs square-QAM constellation and soft decoding at the receiver in order to decode the transmitted bits. The communication system may be a high speed wireline system such as a long-haul coherent optical network, a fixed wireless network such as satellite communication, backhaul microwave system or other terrestrial broadcast system. For example, the $2^{nd}$ generation digital video broadcasting standard (DVB-C2) can have constellation size of up to M=4096, and coherent optical systems with 16 and 64-QAM constellations are being actively deployed for several networks. FEC decoding modules at the receiver may utilize soft-output information, such as LLRs or any other proportionate decision metric. As the demand for data rates in the Gbps range facilitated by the use of higher-order constellations increases, the corresponding requirements for storage of the LLR values can exceed beyond the available memory resources. This in turn may increase both the cost and power consumption of the designed receivers. Moreover, several of the channels mentioned above have to occasionally deal with bursty behavior of the channel noise and or interference. For wireless channels, the frequency selectivity of the channel implies that the received signal has varying levels of power and reliability. Such issues are effectively dealt with using FEC by making use of interleaving modules. Depending on the nature of the channel, the size of these interleavers could be fairly large. The use of interleavers is further motivated by the observations made in "Bit-interleaved Coded Modulation". IEEE Trans. On Information Theory, vol. 44, pp. 928-946, May 1998, whereby performance superiority of interleaved coded modulation techniques is established through analytical and simulative techniques. When the QAM constellation is M-ary, and a non-negative integer L exists such that M=2*L, the complex symbols of the constellation can be said to be from a square constellation. Soft information of the bits is usually rendered in the form of log-likelihood ratios (LLRs) which serve as inputs to S-FECs enabling very low BERs. Embodiments present here relate to the compressed representation of LLRs when the QAM constellation is 2L-ary, enabling efficient storage and transfer of soft bit information, which may permit improved designs for high-performance communication transceivers. The LLR may be computed through the use of a soft demodulation/de-mapping or through the use of MAP/Soft-MLSE equalizers that allow for direct computation of LLRs when employed for mitigation of ISI. FIG. 1 is a diagram of a communications system 100 in which a signal is communicated from a transmitter 110 to a receiver 120 over a communication channel 130. As shown, an encoder 105 encodes a bit-stream, and forwards the encoded bit-stream to the transmitter 110. The encoder 105 may use any type of encoding scheme, including a forward error correction (FEC) encoding scheme, which may be implemented as part of a HARQ retransmission protocol. The transmitter 110 then modulates the encoded bit-stream by mapping the bits in the encoded bit stream to modulation symbols (e.g., QAM symbols, QPSK symbols), and performs additional signal processing steps (e.g., filtering, digital to analog conversion (DAC), amplification) to obtain a signal. The signal is then transmitted over the communication channel 130 to the receiver 120. The communication channel 130 may be any type of channel. In some embodiments, the communication channel 130 includes a wireless link/interface. In such embodiments, the transmitter 110 and the receiver 120 may communicate the signal in accordance with a wireless telecommunication protocol, such as Long Term Evolution (LTE), Worldwide Interoperability for Microwave Access (WiMAX), or Wi-Fi telecommunications protocol. In other embodiments, the communication channel 130 includes a wireline link/interface, e.g., copper line, optical fiber.

Upon reception, the receiver 120 performs various processing steps on the signal (e.g., analog to digital conversion, filtering) prior to symbol demodulation. The de-modulated signal is then decoded at the decoder 125 to obtain a decoded bit-stream. ISI equalization may be performed during, or after, symbol demodulation. Soft-output information (e.g., LLRs) produced during symbol demodulation may be provided to the decoder 125 for use as an input parameter to obtain hard decisions during bit-level decoding. The soft-output information may be generated using various techniques, such as a soft output Viterbi algorithm (SOVA) or Bahl-Cocke-Jelinek-Raviv (BCJR) algorithm. It should be appreciated that the receiver 120 may include other components, such as components that perform symbol timing synchronization and carrier phase estimation and correction prior to symbol demodulation.

Figure 2:
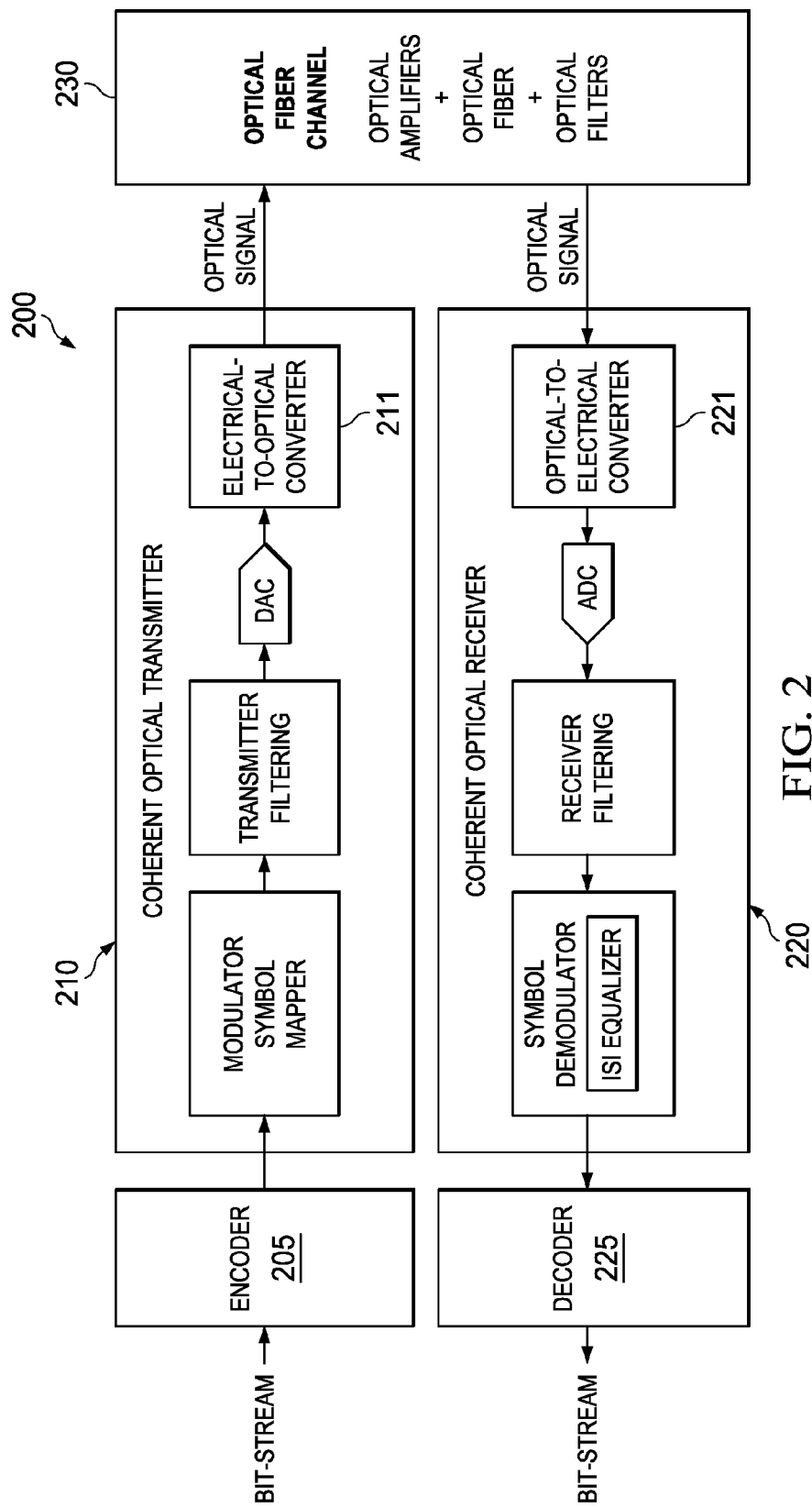
FIG. 2 is a diagram of a coherent optical communications system.

Embodiment ISI equalization techniques described herein can be implemented in coherent optical networks. FIG. 2 is a diagram of a coherent optical system 200 in which data is communicated from a coherent optical transmitter 210 to a coherent optical receiver 220 over an optical fiber channel 230. As shown, an encoder 205 encodes a bit-stream, and then forwards the encoded bit-stream to the coherent optical transmitter 210. The encoder 205 may be configured similarly to the encoder 105, and may use any type of encoding scheme, including forward error correction (FEC) encoding schemes. The coherent optical transmitter 210 then modulates the encoded bit-stream by mapping bits in the encoded bit stream to modulation symbols. The coherent optical transmitter 210 may also perform other signal processing steps (e.g., filtering, digital to analog conversion (DAC), amplification) prior to forwarding the signal to the electrical-to-optical converter 211. Although the electrical-to-optical converter 211 is depicted as being a component of the coherent optical transmitter 210, it should be appreciated that the electrical-to-optical converter 211 may be an independent component that is separate from the coherent optical transmitter 210 in some embodiments. The electrical-to-optical converter 211 may also be referred to as an optical-electrical front end.

The electrical-to-optical converter 211 converts the signal into an optical signal prior to the optical signal being transmitted over the optical fiber channel 230 to the coherent optical receiver 220. The coherent optical channel 230 includes various components, including optical amplifiers, optical fiber, and optical switches and filters. Components of the coherent optical channel 230 may introduce distortion into the optical signal, particularly when the coherent optical channel 230 is a bandwidth limited channel, e.g., a channel in which the frequency response is zero above a certain cutoff frequency.

Upon reception, the coherent optical receiver 220 converts the optical signal to an analog electrical signal at the optical-to-electrical converter 221. Similarly to the electrical-to-optical converter 211, the optical-to-electrical converter 221 may be an internal component of the coherent optical receiver 220, or an independent component that is separate from the coherent optical receiver 220. Thereafter, the coherent optical receiver 220 may perform various signal processing steps (e.g., analog to digital conversion, filtering) prior to symbol demodulation. ISI equalization may be performed during, or after, symbol demodulation. For example, the coherent optical receiver 220 may perform chromatic dispersion (CD) compensation and/or polarization mode dispersion (PMD) compensation prior to ISI equalization. Additionally, soft-output information (e.g., LLRs) may be produced, which may be provided to the decoder 225 as an input for producing hard decisions during bit-level decoding.

Figure 3:
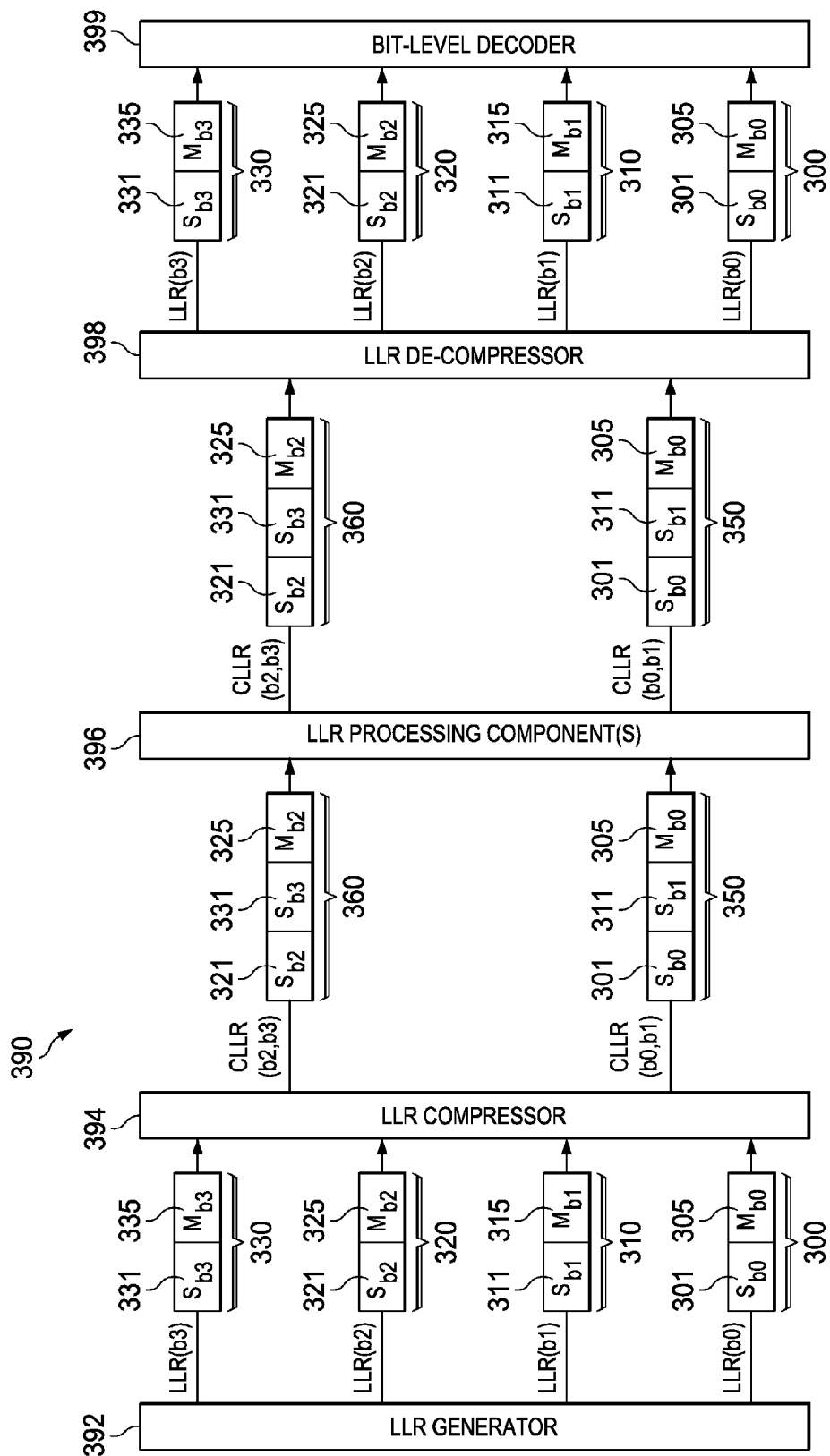
FIG. 3 is a block diagram of an embodiment LLR compression architecture.

FIG. 3 is an embodiment LLR compression architecture 390 for compressing LLRs prior to LLR storage and decompressing the compressed LLRs prior to bit-level decoding. As shown, the embodiment LLR compression architecture 390 includes an LLR generator 392, an LLR compressor 394, an LLR processing component 396, an LLR de-compressor 398, and a bit-level decoder 399. The LLR generator 392 may include any components, or collection of components, configured to produce LLRs from a received signal. In some embodiments, the LLRs may be produced during reduced-state trellis equalization in a manner described in U.S. Non-Provisional patent application Ser. No. 14/795,636 entitled "Method and Apparatus for Low-Complexity Quasi-Reduced State Soft-Output Equalizer," which is incorporated by reference herein as if reproduced in its entirety. Other equalization techniques may also be used to produce LLRs. The LLR compressor 392 may include any components, or collection of components, configured to compress LLRs, and the LLR de-compressor 398 may include any components, or collection of components, configured to de-compress LLRs. The LLR compressor 392 and the LLR de-compressor 398 may collectively achieve LLR compression and de-compression by exploiting the piecewise linear relationship between magnitude component of LLRs for bits corresponding to the same dimension of a square QAM symbol. A dimension of a square QAM symbol may correspond to one of two orthogonal dimensions of a two dimensional plane. Techniques for exploiting that piecewise linear relationship during LLR compression are explained in greater detail below. The LLR processing component 396 may include any combination of components used to process LLRs prior to the LLRs being used for decoding, such as de-interleavers, symbol separators, and memory/buffers. The bit-level decoder 399 may be any component, or collection of components, configured to perform bit-level decoding on a signal using LLRs. In an embodiment, the bit-level decoder 399 comprises an FEC decoder.

In the example, the LLR generator 392 generates LLRs 300-330 for the four bits (b0, b1, b2, b3) of a 16 QAM symbol. Each of the LLRs 300-330 is represented using K bits. Specifically, the LLR 300 includes a sign bit 301 and K−1 magnitude bits 305, the LLR 310 includes a sign bit 311 and K−1 magnitude bits 315, the LLR 320 includes a sign bit 321 and K−1 magnitude bits 325, and the LLR 330 includes a sign bit 331 and K−1 magnitude bits 335. The LLRs 300-330 are then compressed into compressed LLRs 350, 360 by the LLR compressor 394, and the compressed LLRs 350, 360 are processed (e.g., de-interleaved) by the LLR processing component 396. The compressed LLRs 350, 360 are decompressed into the LLRs 300-330 by the LLR de-compressor 398. The decompressed LLRs 300-330 are then forwarded to the bit-level decoder 399, where they are used as an input parameter when making hard decisions during bit-level decoding. While the example in FIG. 3 is an embodiment LLR compression technique being applied to a 16-QAM symbol, it should be appreciated that embodiment LLR compression techniques can be applied to any square QAM symbol, e.g., 64-QAM, etc.

As shown, the compressed LLR 350 includes the sign bit 301 and the magnitude component 305 of the LLR 300, and the sign bit 311 of the LLR 300. The magnitude component of the LLR 310 is excluded from the LLR 350. Likewise, the compressed LLR 360 includes the sign bit 321 and the magnitude component 325 of the LLR 320, and the sign bit 331 of the LLR 330. Similar to the compressed LLR 350, the magnitude component of the LLR 335 is excluded from the LLR 360. It should be appreciated that a compressed LLR can exclude either one of the two magnitude components of LLRs corresponding to the same dimension of a square QAM symbol, so long as it includes the other magnitude component (and both sign bits). For example, the compressed LLR 350 could have included the magnitude component 315, and excluded the magnitude component 305.

FIG. 4A shows decision regions for a b0 bit of a gray-mapped 16 QAM constellation in a constellation diagram 400, FIG. 4B shows decision regions for a b1 bit of the gray-mapped 16 QAM constellation in the constellation diagram 400, FIG. 4C is a table 401 of the signs for the b0 and b1 bits, and FIG. 4D is a graph 402 that demonstrates the piecewise linear relationship between LLRs of the b0 and b1 bits of the 16 QAM symbol. The LLRs for the b0 and b1 bits have two components; a sign bit, and a magnitude portion. Both of the components are determined by the complex value of the received symbol.

The b0 and b1 bits correspond to the real or in-phase (I) component of the received symbol on the constellation diagram, and the imaginary or quadrature (Q) component of the complex value does not affect the LLRs for the b0 and b1 bits.

The real part of the complex value (e.g., the symbol) falls within one of the regions 410-440, or on a border between two of the regions 410-440. The sign bits of the LLRs for the b0 and b1 bits are shown in the table 401. When the complex value is in the region 410, both the b0 and b1 bits are equal to zero. When the complex value is in the region 420, the b0 bit is equal to zero and the b1 bit is equal to one. When the complex value is in the region 430, both the b0 and b1 bits are equal to one. When the complex value is in the region 440, the b0 bit is equal to one and the b1 bit is equal to zero.

From this, it can be seen that the b0 bit transitions from zero to one at the border between regions 420 and 430. Consequently, the border between regions 420 and 430 generally corresponds to the least confidence in the sign of the LLR for the b0. The left-most edge of the region 410 and the right-most edge of the region 440 represent the furthest points from the transitionary border of the b0 bit. As a result, the left-most edge of the region 410 generally corresponds to a highest confidence that the sign of the LLR for the b0 bit is zero, while the right-most edge of the region 440 generally corresponds to a highest confidence that the sign of the LLR for the b0 bit is one.

Similarly, it can be seen that the b1 bit transitions from zero to one at the border between the regions 410 and 420 as well as at the border between the regions 430 and 440, with those borders corresponding to the least confidence in the sign of the LLR for the b1 bit. The border between the regions 420 and 430, the left-most edge of the region 410, and the right-most edge of the region 440 represent the furthest points from the transitionary borders of the b1 bit. As such, the left-most edge of the region 410 and the right-most edge of the region 440 correspond to a highest confidence that the sign of the LLR for the b1 bit is zero, while the border between the regions 420 and 430 corresponds to a highest confidence that the sign of the LLR for the b1 bit is one. The graph 402 illustrates the piece-wise linear relationship between LLRs of the b0 bit and the b1 bit. In the graph 402, LLRs less than zero have a sign bit of zero, and LLRs greater than zero have a sign bit of 1. In the graph 402, the absolute value of the LLR corresponds to the level of confidence in the sign bit of the LLR. Thus, an LLR equal to zero indicates the least confidence in the sign bit of the corresponding LLR. The lowest LLR value (a negative LLR with the highest magnitude) indicates the highest confidence that the sign bit of the LLR is zero. A highest LLR value (a positive LLR with the highest magnitude) indicates the highest confidence that the sign bit of the LLR is one.

An LLR compressor may compress the LLRs from the b0 and b1 bits by removing the magnitude component of the LLR of the b1 bit. From the piecewise linear relationship between the b0 and b1 bit demonstrated by the graph 402, an LLR decompressor may derive the magnitude of the LLR for the b1 bit from the magnitude of the LLR of the b0 bit and the sign of the LLRs of the b0 and b1 bits. Alternatively, the LLR compressor may compress the LLRs by removing the magnitude of the LLR of the b0 bit, in which case the LLR decompressor may derive the magnitude of the LLR of the b0 bit from the magnitude of the LLR of the b1 bit and the sign of the LLRs of the b0 and b1 bits.

A similar technique can be used to compress the LLRs of b2 and b3 bits of a 16 QAM symbol. FIG. 5A shows decision regions of a b2 bit of a gray code mapped 16 QAM constellation in a constellation diagram 500, FIG. 5B shows decision regions for a b3 bit of the gray code mapped 16 QAM constellation in the constellation diagram 500, FIG. 5C is a table 501 of the signs for the b2 and b3 bits, and FIG. 5D is a graph 502 that demonstrates the piecewise linear relationship between LLRs of the b2 and b3 bits of the 16 QAM symbol. The vertical position of the complex value (e.g., the symbol) falls within one of the regions 510-540, or on a border between two of the regions 510-540.

An LLR compressor may compress the LLRs from the b2 and b3 bits by removing the magnitude component of the LLR of the b3 bit. An LLR decompressor may then determine the magnitude component of the LLR for the b3 bit from the magnitude of the LLR for the b2 bit and the sign of the LLRs of the b2 and b3 bits. Alternatively, an LLR compressor may compress the LLRs from the b2 and b3 bits by removing the magnitude component of the LLR of the b2 bit, and an LLR decompressor may determine the magnitude component of the LLR for the b2 bit from the magnitude of the LLR for the b3 bit and the sign of the LLRs of the b2 and b3 bits.

While FIGS. 4D and 5D demonstrate how the piecewise relationship of bits in a 16 QAM symbol can be exploited to achieve LLR compression, it should be appreciated that those LLR compression techniques are applicable to any square QAM modulation symbol. Similar techniques may also be applied to other symbols, such as Quadrature Phase Shift Keying (QPSK) symbols. While FIGS. 4-5 depict how the piecewise linear relationship is exploited to achieve LLR compression in a gray code mapping scheme, it should be appreciated that the embodiment LLR compression schemes are applicable to other mapping schemes as well, e.g. anti-gray mapping. Moreover, while the LLRs in FIGS. 4D and 5D are defined as log(prob (b=1)/prob(b=0)), it should be appreciated that embodiment LLR compression schemes are equally applicable when LLRs are defined as log(prob (b=0)/prob(b=1)).

Figure 6:
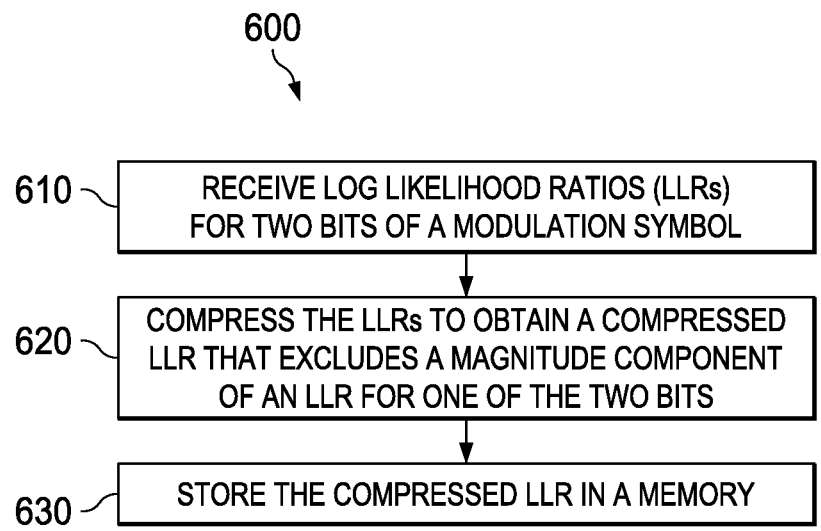
FIG. 6 is a flow chart of an embodiment method for compressing LLRs.

FIG. 6 is a flowchart of an embodiment method 600 for compressing LLRs, as might be performed by an LLR compressor. At step 610, the LLR compressor receives LLRs for at least two constituent bits of a modulation symbol. At step 620, the LLR compressor compresses the LLRs to obtain a compressed LLR. The compressed LLR excludes a magnitude component of an LLR for one of the two bits. The LLR compression may be achieved by exploiting the piecewise linear relationship between magnitude components of the LLRs for binary information bits corresponding to the same dimension of a symbol. At step 630, the compressor stores the compressed LLR in a memory.

Figure 7:
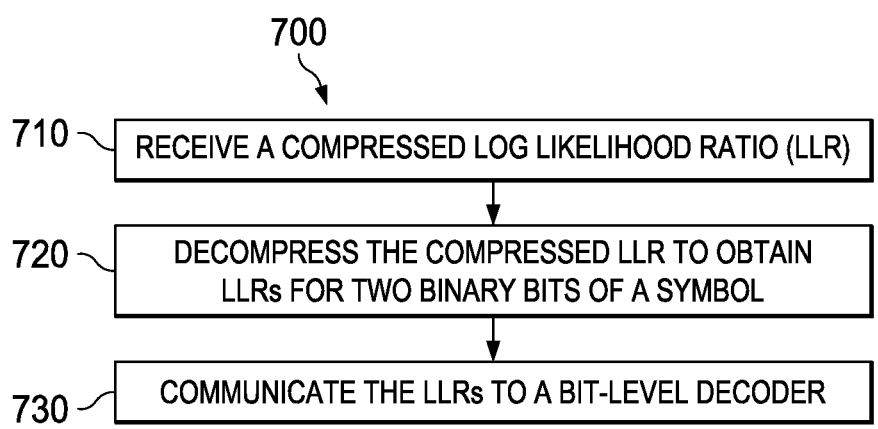
FIG. 7 is a flow chart of another embodiment method for de-compressing LLRs.

FIG. 7 is a flowchart of an embodiment method 700 for de-compressing LLRs, as might be performed by an LLR de-compressor. At step 710, the LLR de-compressor receives a compressed LLR. At step 720, the LLR de-compressor de-compresses the compressed LLR to obtain LLRs for two bits of symbol. At step 730, the LLR de-compressor communicates the LLRs to a bit-level decoder, where they are used as an input parameter during bit-level decoding.

Figure 8:
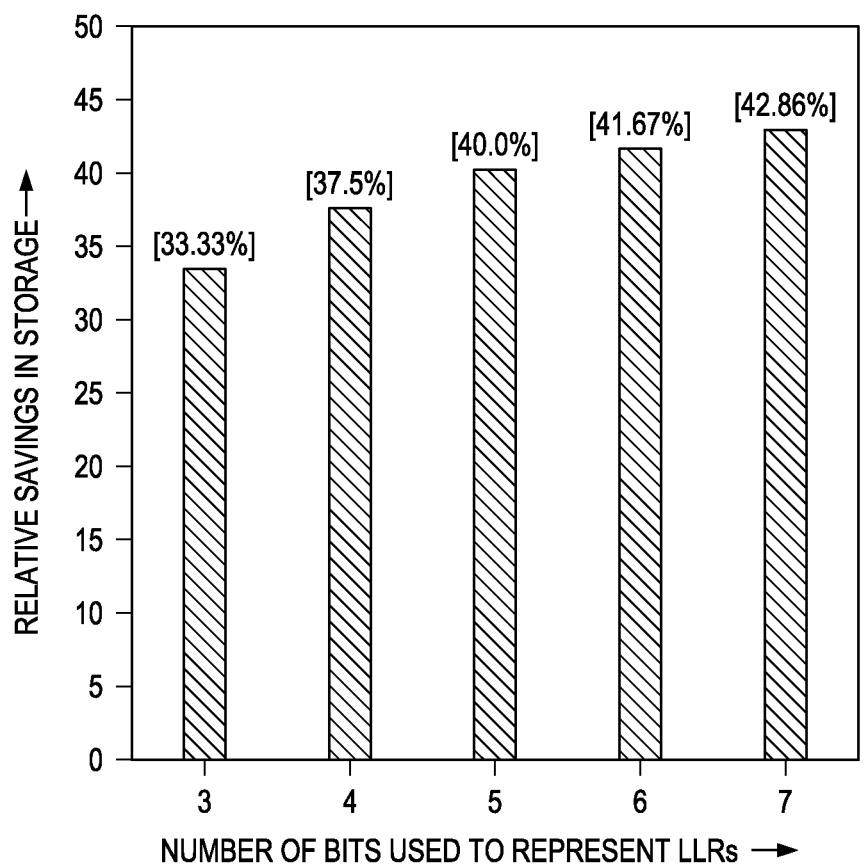
FIG. 8 is a graph of the relative storage savings for different length LLRs.

The relative storage savings for embodiment LLR compression techniques depends on the number of bits used to represent the LLRs prior to compression. FIG. 8 is a graph demonstrating the relative storage savings for different length LLRs. As can be seen, the higher the number of bits used to represent the LLR, the greater the storage savings.

An LLR may be computed according to the following equation:

$$llr(b_i) = \ln\left(\frac{Pr(b_i = 1 | S_k)}{Pr(b_i = 0 | S_k)}\right) = \ln\left[\frac{\sum_{S_k^1 \in \{S_{\{b_i=1\}}\}} \frac{|Y_k - S_k^1|^2}{2\sigma^2}}{\sum_{S_k^0 \in \{S_{\{b_i=0\}}\}} \left(\frac{|Y_k - S_k^0|^2}{2\sigma^2}\right)}\right], \quad (1)$$

where $Pr(b_i=0|S_k)$ is the probability that a given bit $(b_i)$ is zero, $Pr(b_i=1|S_k)$ is the probability that the bit is one, $S_k$ is chosen from the set of symbols constituting the square M-QAM constellation, $S_k^1$ is the set of symbols from the square M-QAM constellation where the bit $b_i$ is 1, $S_k^0$ is the set of symbols from the square M-QAM constellation where the bit $b_i$ is 0, $Y_k$ denotes the received symbol, and $\sigma$ is the standard deviation of the additive white Gaussian noise (AWGN) that impairs the signal. In some embodiments, LLRs are computed without the standard deviation of the AWGN ($\sigma$). The soft-demodulation of a symbol using this equation may be fairly computationally complex. For implementation purposes, several approximation techniques have been developed for both QAM and PSK constellations, as discussed by Institute of Electrical and Electronics Engineers (IEEE) publications entitled "8-PSK trellis codes for a Rayleigh channel," (IEEE Trans. In Comm., vol. 40, no. 5, pp. 873-884, May 1992), "A systematic bit-wise decomposition of M-ary symbol metric," (IEEE Trans. On Wireless Comm., vol. 5, pp. 2742-2751, October 2006), and "Linear LLR Approximation for Iterative Decoding on Wireless Channels" (IEEE Trans. on Comm., Vol. 57, No. 11, November 2009), each of which are incorporated by reference herein as if reproduced in their entireties.

Figure 9:
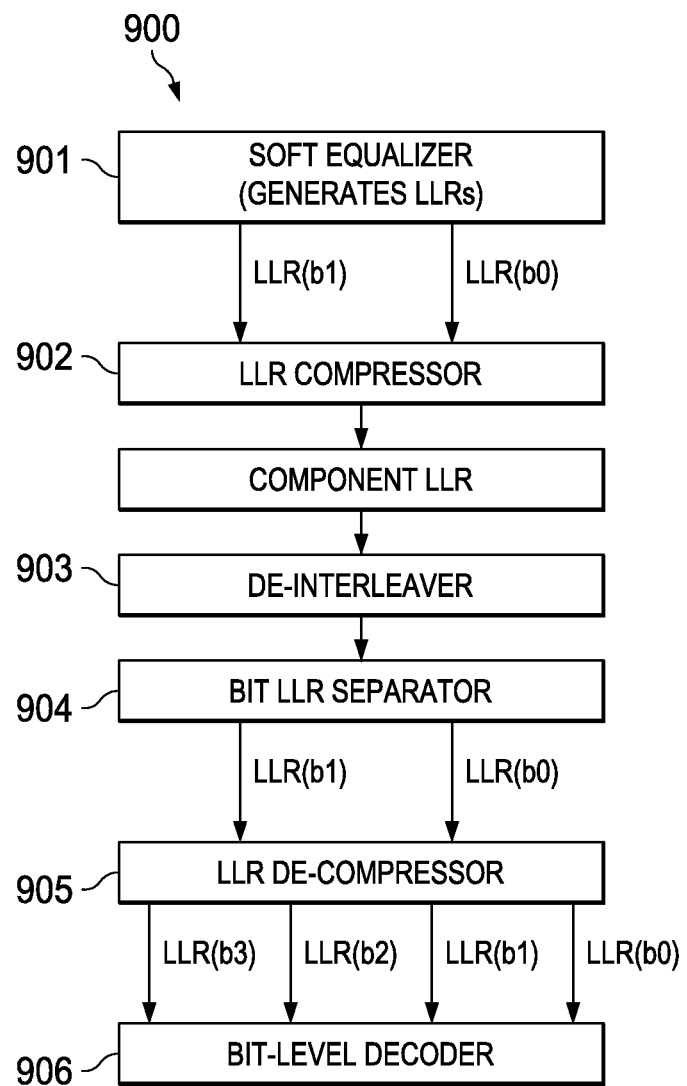
FIG. 9 is a diagram of an embodiment receiver.

After LLRs are computed, they may be de-interleaved before being passed on to the FEC for decoding. FIG. 9 is an embodiment receiver 900 for compressing LLRs prior to de-interleaving and decompressing the compressed LLRs after de-interleaving. As shown, the embodiment receiver 900 includes an LLR generator 901, an LLR compressor 902, a de-interleaver 903, a bit LLR separator 904, an LLR de-compressor 905, and a bit-level decoder 906. The LLR generator, LLR compressor 902, the LLR de-compressor 905, and the bit-level decoder 906 may be similar to corresponding components in the embodiment LLR compression architecture 300.

The de-interleaver 903 may include any component, or collection of components, configured to de-interleave the LLRs. Interleaving is a technique that is used to increase the performance of forward error correcting (FEC) codes. Errors typically occur in bursts of symbols, rather than independently. FEC codes are typically designed to recover from the occasional erroneous symbol so long as enough nearby symbols are correctly received. Thus, it is helpful to interleave symbols prior to transmission to create a more uniform distribution of errors. Interleaving prior to transmission typically requires that the symbols be de-interleaved upon reception. For various reasons, symbol de-interleaving may be performed at the bit-level after LLR generation. The bit-separator 904 may include any component, or collection of components, configured to remove the grouping of bits at the output of symbol de-interleaver into parallel paths. The number of parallel paths may typically be equal to M/2 for square M-QAM constellations.

Some receivers use a soft-output equalizer in conjunction with a symbol interleaver. The role of the equalizer is to take in highly distorted signal samples that are temporally correlated due to the channel and produce LLRs. Equalizers may employ various techniques to generate the LLRs, such as maximum a-posteriori (MAP) or maximum likelihood sequence estimation (MLSE) based approaches.

Figure 10:
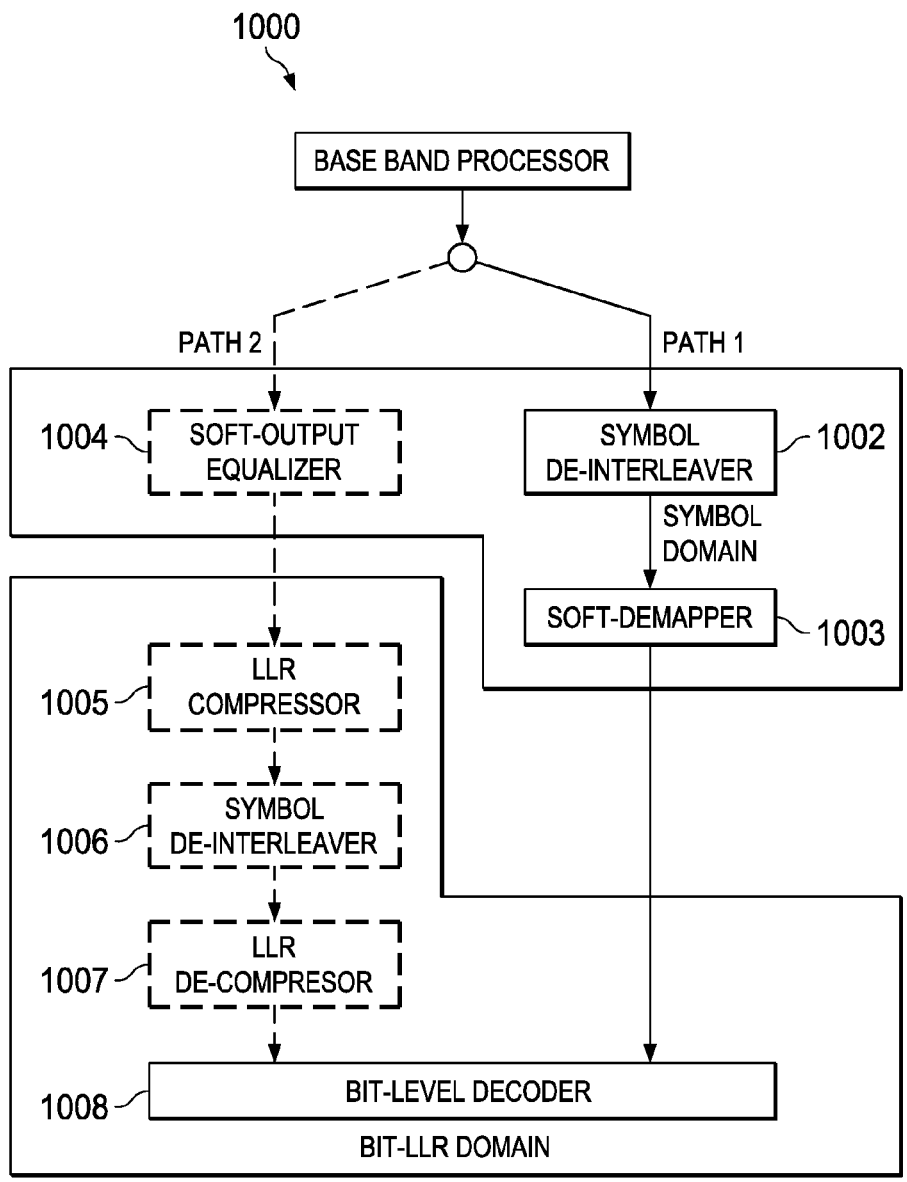
FIG. 10 is a diagram of another embodiment receiver.

Embodiment LLR compression techniques may be employed in systems that perform interleaving after generating LLRs. To reduce power consumption, some receivers may have multiple modes, such that symbol de-interleaving may be performed before LLR generation or after LLR generation depending on various factors, such as the condition of the channel. FIG. 10 is an embodiment receiver 1000 for supporting multiple equalization modes. As shown, the embodiment receiver 1000 comprises a baseband processor 1001, a symbol de-interleaver 1002, a soft de-mapper 1003, a soft-output equalizer 1004, an LLR compressor 1005, a symbol de-interleaver 1006, an LLR decompressor 1007, and a bit-level decoder 1008. The baseband processor 1001 may include any component, or combination of components, configured to process (e.g., filter, down convert, etc.) a physical-layer signal received over a channel to obtain a baseband signal that includes a sequence of symbols. The symbol de-interleavers 1002 and 1006 may be similar to one another, except that the symbol de-interleaver 1002 is configured to de-interleave symbols prior to LLR generation, while the symbol de-interleaver 1006 is configured to de-interleave groups of LLRs corresponding to respective symbols following LLR generation. The bit-level decoder 1008 may be similar to the bit-level decoder 906.

Notably, the embodiment equalization architecture 1000 includes two alternative data-paths corresponding to different modes. In one mode, the soft-output equalizer 1004 is activated, and the data flows over path 2. In that mode, the LLRs are generated at the soft-output equalizer 1004. The LLRs are then compressed at the LLR compressor 1005, and the symbol de-interleaver 1006 de-interleaves groups of compressed LLRs corresponding to respective symbols. After the de-interleaving step, the compressed LLRs are decompressed at the LLR decompressor 1007. In another mode, the soft-output equalizer 1004 is de-activated, and the data flows over path 1. In that mode, the LLRs are generated at the soft-de-mapper 1003 after passing through the symbol de-interleaver 1002.

The symbol de-interleavers 1002, 1006 perform the same function in their respective paths. In some implementations, the de-interleavers 1002, 1006 are the same component. However, since the soft-output equalizer 1004 in path-2 converts the symbols into LLRs prior to the de-interleaving step, the resource requirements for the symbol de-interleaver 1006 may be greater than that of the symbol de-interleaver 1002 without LLR compression. When the de-interleavers 1002, 1006 are the same component, the resource requirements of the component may be based on the processing/storage requirements of the de-interleaver 1006. This imbalance may affect the design and/or performance of the receiver, as it may require either using shorter LLRs to reduce the amount of resources used by the symbol de-interleaver 1006, or using a larger silicon footprint to allow more resources to be allocated to the de-interleaver 1006. Including the LLR compressor 1005 and LLR decompressor 1007 reduces or eliminates this disparity. The memory savings obtained may be particularly beneficial for systems requiring deep interleaving, e.g., interleaving of a large data blocks.

Figure 11:
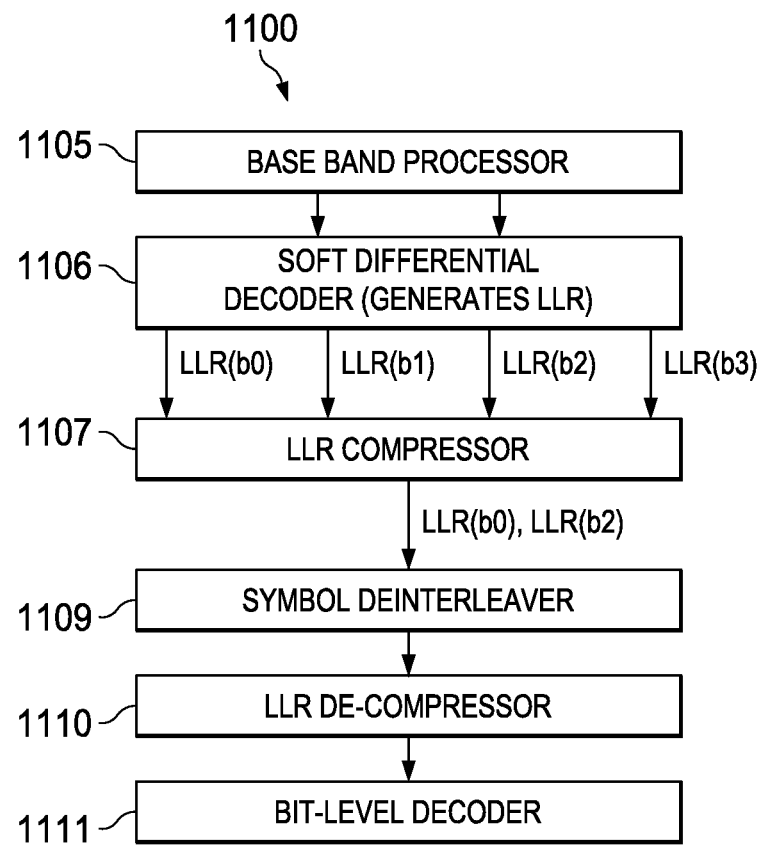
FIG. 11 is a diagram of another embodiment receiver.

In some systems, a symbol differential encoder is employed at the transmitter to reduce the impact of phase noise. In such systems, the receiver may use soft differential decoding techniques to generate LLR outputs. FIG. 11 is an embodiment receiver 1100 for generating LLRs using a soft differential decoding techniques. As shown, the embodiment receiver 1100 includes a baseband processor 1105, a soft differential decoder 1106, an LLR compressor 1107, a symbol de-interleaver 1109, an LLR de-compressor 1110, and a bit-level decoder 1111. The LLR compressor 1107, the symbol de-interleaver 1109, the LLR de-compressor 1110, and the bit-level decoder 1111 may be similar to corresponding components in the embodiment receiver 900. The baseband processor 1105 may be similar to the baseband processor 1001 in FIG. 10. The soft-differential decoder 1106 may be configured to generate LLRs using a soft-differential decoding technique.

Embodiments LLR compression techniques may generate compressed LLRs using operations that are reversible and of relatively low complexity. In particular, the operations tend to leverage the symmetric relationships between the LLRs of the coded bits. Embodiment LLR compression techniques can be implemented in schemes that utilize puncturing schemes. Additionally, the embodiment LLR compression techniques can be used for any constellation mapping scheme, as long as at least one of the bits from within a tuple of bits has an LLR value computed at the receiver.

In one example, LLR compression is used for a 16-QAM symbol. The 4-bit LLRs obtained from a given symbol for a quadruplet of bits $[b_0 b_1 b_2 b_3]$ are denoted as $[llr(b0) llr(b1) llr(b2) llr(b3)]$. The absolute values in a piecewise linear relationship are dependent on the data path and when an appropriate gain normalization is used to restore the signal energies at the receiver baseband. The general form of the linear relationship can be represented by the following equation:

$$llr(b1) = sgn(llr(b1)) \begin{cases} k_1 - |llr(b0)|, & |llr(b0)| \leq k1 \\ k_2 - \frac{||llr(b0)||}{C}, & |llr(b0)| > k2 \end{cases},$$

where $llr(b0)$ is the LLR corresponding to the b0 bit, $llr(b1)$ is the LLR corresponding to the b1 bit, $k_1$ and $k_2$ are constants associated with the DSP data path (e.g., automatic gain control (AGC) levels), and C is the number of bits in the LLR. If the number of bits used to represent an LLR is denoted as K, the number of bits used to represent N M-QAM symbols is given by the following equation: $A = N*\log_2(M)*K$, where A is the number of LLR bits, and M represents the size of the constellation. With typical interleaving depths in low thousands of symbols (e.g., 1024/2048/4096), such representation leads to relatively large memory requirements. Embodiment LLR compression techniques provided herein reduce the number of bits used to represent the LLRs. The number of bits used to represent compressed LLRs for N M-QAM symbols is given by the following equation:

$$B = \left(\frac{N}{2}\right) * \log_2(M) * (K+2)$$

bits, where B is the number of bits used to represent the compressed LLRs. Therefore, the net savings is given by the following equation:

$$S = N * \log_2(M) * K - \left(\frac{N}{2}\right) * \log_2(M) * (K+1) = N * \log_2(M) * \frac{(K-1)}{2},$$

where S is the number of bits saved. Alternatively, expressed in terms of fraction of the original storage requirements, $$\frac{100*(K-1)}{2K}$$

percent savings are obtained. Some example savings for various values of K are shown in FIG. 8 for 16-QAM.

Figure 12:
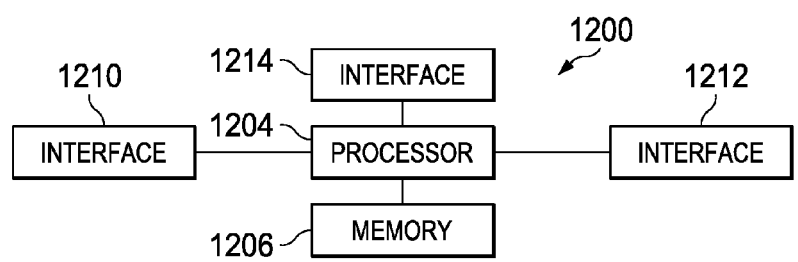
FIG. 12 is a block diagram of an embodiment processing system.

FIG. 12 is a block diagram of an embodiment processing system 1200 for performing methods described herein, which may be installed in a host device. As shown, the processing system 1200 includes a processor 1204, a memory 1206, and interfaces 1210-1214, which may (or may not) be arranged as shown in FIG. 12. The processor 1204 may be any component or collection of components adapted to perform computations and/or other processing related tasks, and the memory 1206 may be any component or collection of components adapted to store programming and/or instructions for execution by the processor 1204. In an embodiment, the memory 1206 includes a non-transitory computer readable medium. The interfaces 1210, 1212, 1214 may be any component or collection of components that allow the processing system 1200 to communicate with other devices/components and/or a user. For example, one or more of the interfaces 1210, 1212, 1214 may be adapted to communicate data, control, or management messages from the processor 1204 to applications installed on the host device and/or a remote device. As another example, one or more of the interfaces 1210, 1212, 1214 may be adapted to allow a user or user device (e.g., personal computer (PC)) to interact/communicate with the processing system 1200. The processing system 1200 may include additional components not depicted in FIG. 12, such as long term storage (e.g., non-volatile memory).

In some embodiments, the processing system 1200 is included in a network device that is accessing, or part otherwise of, a telecommunications network. In one example, the processing system 1200 is in a network-side device in a wireless or wireline telecommunications network, such as a base station, a relay station, a scheduler, a controller, a gateway, a router, an applications server, or any other device in the telecommunications network. In other embodiments, the processing system 1200 is in a user-side device accessing a wireless or wireline telecommunications network, such as a mobile station, a user equipment (UE), a personal computer (PC), a tablet, a wearable communications device (e.g., a smartwatch), or any other device adapted to access a telecommunications network.

Figure 13:
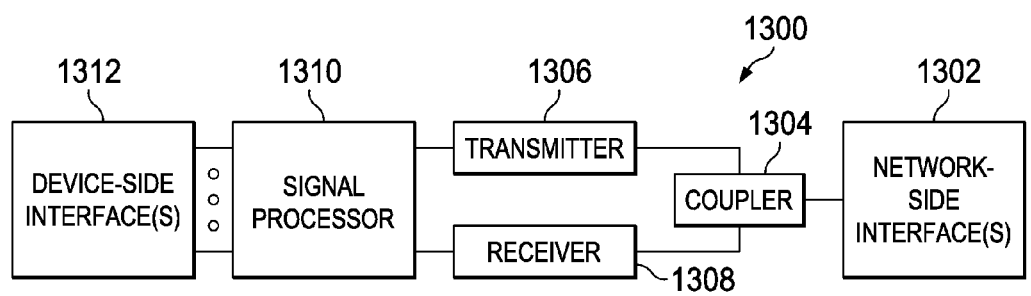
FIG. 13 is a block diagram of an embodiment transceiver.

In some embodiments, one or more of the interfaces 1210, 1212, 1214 connects the processing system 1200 to a transceiver adapted to transmit and receive signaling over the telecommunications network. FIG. 13 is a block diagram of a transceiver 1300 adapted to transmit and receive signaling over a telecommunications network. The transceiver 1300 may be installed in a host device. As shown, the transceiver 1300 comprises a network-side interface 1302, a coupler 1304, a transmitter 1306, a receiver 1308, a signal processor 1310, and a device-side interface 1312. The network-side interface 1302 may include any component or collection of components adapted to transmit or receive signaling over a wireless or wireline telecommunications network. The coupler 1304 may include any component or collection of components adapted to facilitate bi-directional communication over the network-side interface 1302. The transmitter 1306 may include any component or collection of components (e.g., up-converter, power amplifier) adapted to convert a baseband signal into a modulated carrier signal suitable for transmission over the network-side interface 1302. The receiver 1308 may include any component or collection of components (e.g., down-converter, low noise amplifier) adapted to convert a carrier signal received over the network-side interface 1302 into a baseband signal. The signal processor 1310 may include any component or collection of components adapted to convert a baseband signal into a data signal suitable for communication over the device-side interface(s) 1312, or vice-versa. The device-side interface(s) 1312 may include any component or collection of components adapted to communicate data-signals between the signal processor 1310 and components within the host device (e.g., the processing system 1200, local area network (LAN) ports).

The transceiver 1300 may transmit and receive signaling over any type of communications medium. In some embodiments, the transceiver 1300 transmits and receives signaling over a wireless medium. For example, the transceiver 1300 may be a wireless transceiver adapted to communicate in accordance with a wireless telecommunications protocol, such as a cellular protocol (e.g., LTE), a wireless local area network (WLAN) protocol (e.g., Wi-Fi), or any other type of wireless protocol (e.g., Bluetooth, near field communication (NFC)). In such embodiments, the network-side interface 1302 comprises one or more antenna/radiating elements. For example, the network-side interface 1302 may include a single antenna, multiple separate antennas, or a multi-antenna array configured for multi-layer communication, e.g., single input multiple output (SIMO), multiple input single output (MISO), multiple input multiple output (MIMO) In other embodiments, the transceiver 1300 transmits and receives signaling over a wireline medium, e.g., twisted-pair cable, coaxial cable, optical fiber. Specific processing systems and/or transceivers may utilize all of the components shown, or only a subset of the components, and levels of integration may vary from device to device.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for compressing soft output information, the method comprising:
   receiving log likelihood ratios (LLRs) for a modulation symbol, the LLRs including at least a first LLR for a first binary information bit in the modulation symbol and a second LLR for a second binary information bit in the modulation symbol;
   compressing the first LLR and the second LLR to obtain a compressed LLR, wherein a magnitude component of the second LLR is excluded from the compressed LLR; and
   communicating the compressed LLR to a symbol de-interleaver.

2. The method of claim 1, wherein the compressed LLR includes a first sign bit of the first LLR, a second sign bit of the second LLR, and a first set of magnitude bits of the first LLR.

3. The method of claim 2, wherein a confidence level of the second sign bit of the second LLR is estimated by a downstream LLR de-compressor based on the first set of magnitude bits of the first LLR.

4. The method of claim 2, wherein the first set of magnitude bits of the first LLR indicate a confidence level in the first sign bit of the first LLR, and wherein the compressed LLR does not include any bits indicating a confidence level in the second sign bit of the second LLR.

5. The method of claim 2, wherein the compressed LLR consists of the first sign bit of the first LLR, the second sign bit of the second LLR, and the first set of magnitude bits of the first LLR.

6. The method of claim 2, wherein the second LLR includes a second set of magnitude bits indicating a confidence level in the second sign bit of the second LLR, and the second set of magnitude bits being excluded from the compressed LLR.

7. The method of claim 6, wherein the second set of magnitude bits of the second LLR are estimated by a downstream LLR de-compressor based on the first sign bit of the first LLR, the second sign bit of the second LLR, and the first set of magnitude bits of the first LLR.

8. The method of claim 6, wherein the second set of magnitude bits are estimated in accordance with a statistical correlation between confidence levels of the first binary information bit and the second binary information bit.

9. The method of claim 1, wherein both the first binary information bit and the second binary information bit correspond to the same dimension of the modulation symbol.

10. The method of claim 1, wherein the modulation symbol is a square quadrature amplitude modulation (QAM) symbol.

11. The method of claim 1, wherein the modulation symbol is a Quadrature Phase Shift Keying (QPSK) symbol.

12. An apparatus comprising:
a processor; and
a computer readable storage medium storing programming instructions executed by the processor to:
receive log likelihood ratios (LLRs) for a modulation symbol, the LLRs including
at least a first LLR for a first binary information bit in the modulation symbol and a second LLR for a second binary information bit in the modulation symbol;
compress the first LLR and the second LLR to obtain a compressed LLR, wherein
a magnitude component of the second LLR is excluded from the compressed LLR; and
communicate the compressed LLR to a symbol de-interleaver.

13. The apparatus of claim 12, wherein the compressed LLR includes a first sign bit of the first LLR, a second sign bit of the second LLR, and a first set of magnitude bits of the first LLR.

14. The apparatus of claim 13, wherein the compressed LLR consists of the first sign bit of the first LLR, the second sign bit of the second LLR, and the first set of magnitude bits of the first LLR.

15. The apparatus of claim 14, wherein the second LLR includes a second set of magnitude bits indicating a confidence level in the second sign bit, and the second set of magnitude bits being excluded from the compressed LLR.

16. A method for de-compressing soft output information, the method comprising:
receiving a compressed log likelihood ratio (LLR), the compressed LLR including a first sign bit indicating a value of a first binary information bit in a modulation symbol, a first set of magnitude bits indicating a confidence level of the first sign bit, and a second sign bit indicating a value of a second binary information bit in the modulation symbol;
decompressing the compressed LLR to obtain a first LLR for the first binary information bit and a second LLR for the second binary information bit, the first LLR comprising the first sign bit and the first set of magnitude bits, and the second LLR comprising the second sign bit and a second set of magnitude bits indicating a confidence level in the second sign bit, wherein the second set of magnitude bits are excluded from the compressed LLR; and
communicating the first LLR and the second LLR to a bit-level decoder.

17. The method of claim 16, wherein the compressed LLR consists of the first sign bit, the second sign bit, and the first set of magnitude bits.

18. The method of claim 16, wherein decompressing the compressed LLR comprises estimating the confidence level of the second sign bit based on a correlation between confidence levels of the first binary information bit and the second binary information bit.

19. The method of claim 16, wherein both the first binary information bit and the second binary information bit correspond to the same dimension of the modulation symbol.

20. An apparatus comprising:
a processor; and
a computer readable storage medium storing programming instructions executed by the processor to:
receive a compressed log likelihood ratio (LLR), the compressed LLR including a first sign bit indicating a value of a first binary information bit in a modulation symbol, a first set of magnitude bits indicating a confidence level of the first sign bit, and a second sign bit indicating a value of a second binary information bit in the modulation symbol;
decompress the compressed LLR to obtain a first LLR for the first binary information bit and a second LLR for the second binary information bit, the first LLR comprising the first sign bit and the first set of magnitude bits, and the second LLR comprising the second sign bit and a second set of magnitude bits indicating a confidence level in the second sign bit; and
communicate the first LLR and the second LLR to a bit-level decoder, wherein the second set of magnitude bits are excluded from the compressed LLR.

21. The apparatus of claim 20, wherein the compressed LLR consists of the first sign bit, the second sign bit, and the first set of magnitude bits.

22. The apparatus of claim 20, wherein when decompressing the compressed LLR, the processor estimates the confidence level of the second sign bit based on a correlation between confidence levels of the first binary information bit and the second binary information bit.

23. The apparatus of claim 12, wherein both the first binary information bit and the second binary information bit correspond to the same dimension of the modulation symbol.

24. The apparatus of claim 20, wherein both the first binary information bit and the second binary information bit correspond to the same dimension of the modulation symbol.

* * * * *